US006075891A

United States Patent [19]

Burman

[11] Patent Number: 6,075,891

[45] Date of Patent: Jun. 13, 2000

[54] NON-LITERAL PATTERN RECOGNITION METHOD AND SYSTEM FOR HYPERSPECTRAL IMAGERY EXPLOITATION

[75] Inventor: Jerome Allen Burman, Westlake Village, Calif.

[73] Assignee: General Dynamics Government Systems Corporation, Mountain View, Calif.

[21] Appl. No.: 09/111,039

[22] Filed: Jul. 6, 1998

[51] Int. Cl.[7] .............................. G06K 9/46; G06K 9/62; G06K 9/66

[52] U.S. Cl. .......................... 382/191; 382/190; 382/224; 382/225

[58] Field of Search .................................... 382/190, 191, 382/195, 284, 224, 225; 235/454, 457

[56] References Cited

U.S. PATENT DOCUMENTS 4,167,729 9/1979 Christenson et al. ................... 382/191

OTHER PUBLICATIONS

Gong "Forest Canopy Closure from Classification and Spectral Mixing of Scene Components: Multi–Sensor Evaluation of Application to an Open Canopy", Geoscience & Remote Sensing Symposium, pp. 747–749, vol. 2, 1993.

Wan, et al "A Self–Organizing Map Model for Spatial and Temporal Contextual Classification", IEEE, pp. 1867–1869, 1994.

Preissler, et al "Extraction of Soil Properties From Laboratory and Imaging Spectrometry Data", IEEE, pp. 1968–1970, 1995.

Boutid: "An Operational Approach To Monitor Vegitation Using Remote Sensing", IEEE, pp. 2697–2700, Jun. 1998.

Gong, et al "Forest Canopy Closure From Classification and Spectral Unmixing of Scene Components Multi–Sensor Evaluation of an Open Canopy", IEEE, pp. 1067–1080, 1994.

Barr, S. "Hyperspectral Image Processing", Proceedings of the Symposium on Spectral Sensing Research, V1, Jul. 1994, pp. 477–490.

Bosch, E. H., "The Effects Different Neural Network Architectures Have on the Exploitation of Hyperspectral Data", Proceedings of te symposium on spectral Sennsing Research, V1, Nov. 1995.

D. G. Luenberger, Stanford University, *Optimization by Vector Space Methods*, John Wiley & Sons, 1969, pp. 53–55.

Z. Michalewicz, *Genetic Algorithms+Data Structures=Evolution Programs*, Springer Verlag, 2nd ed, 1994, pp. 18–23, 31–55, 98–99, 108–117, 122–141, and 168–175.

T. Kohonen, *Self–Organization and Associative Memory*, Springer–Verlag, Heidelberg, 3rd edition, 1989, pp. 119–207.

W. Punch, "Further Research on Feature Selection and Classification Using Genetic Algorithms", ICGA93, pp. 557–564, Champaign, Ill, 1993.

F. Brill, "Fast Genetic Selection of Features for Neural Network Classifiers", IEEE Trans. On Neural Networks, vol. 3, No. 2, Mar. 1992.

International Symposium on Spectral Sensing Research (ISSSR) '94, Jul. 1994, San Diego, CA.

C. Hallum, "A Change Detection Strategy for Monitoring Vegetative and Land Use Cover Types Using Remotely Sensed, Satellite Based Data", Remote Sens. Environ., 43, pp. 171–177, 1993.

(List continued on next page.)

*Primary Examiner*—Phuoc Tran
*Assistant Examiner*—Daniel G. Mariam
*Attorney, Agent, or Firm*—Jenner & Block

[57] ABSTRACT

A processing system and method identifies materials present in a pixel of a multispectral or a hyperspectral image. Underlying data models representing spectral endmembers or materials of interest and model based relationships are used to identify the materials. The processing system and method provide a technique that detects, unmixes, and classifies spectral signatures for terrain categorization and object identification.

6 Claims, 9 Drawing Sheets

Scan object area to produce image set — 210

Extract the spectral signature of a single pixel in the image set — 220

Convert pixel signature to a feature vector — 230

Process the feature vector with a filter — 240

Normalize the filtered feature vector — 250

OTHER PUBLICATIONS

H. Bischof, "Multispectral Classification of Landsat Images Using Neural Networks", IEEE Trans. On Geosci. and Remote Sens., vol. 30, No. 3, May 1992.

J. Adams, "Spectral Mixture Modeling: A New Analysis of Rock and Soil Types at the Viking Lander 1 Site", Journ. Of Geophysical Res, vol. 91, No. B8, pp. 8089–8112, Jul. 7, 1986.

A. Gillespie, "Spectral Mixture Analysis of Multispectral Thermal Infrared Images", Remote Sens. Environ., 42:137–145, 1992.

L. Mertes, "Estimating Suspended Sediment Concentrations in Surface Waters of the Amazon River Wetlands from Landsat Images", Remote Sens. Environ., 43:281–301, 1993.

S. Stearns, "Dimensionality Reduction by Optimal Band Selection for Pixel Classification of Hyperspectral Imagery", SPIE vol. 2028, Applications of Digital Image Processing, XVI, 1993.

T. Fung, "An Assessment of TM Imagery for Land Cover Change Detection", IEEE Trans. On Geosci. And Remote Sens., vol. 28, No. 4, Jul. 1990.

D. Sabol, "Quantitative Subpixel Spectral Detection of Targets in Multispectral Images", Journ. Of Geophysical Res., vol. 97, No. E2, pp. 2659–2672, Feb. 1992.

J. Schott, "Radiometric Scene normalization Using Pseudoinvariant Features", Remote Sens. Of Environ., 26:1–16, 1988.

T. W. Ray and B. C. Murray, "Non–Linear Spectral Mixing in Desert Vegetation," Remote Sens. Environ., 1995.

T. Kohonen and K. Makisara, "Representation of Sensory Information In Self–Organizing Feature Maps," American Institute of Physics, 1986.

Zbigniew Michalewicz, "Evolutionary Computation Techniques for Nonlinear Programming Problems".

Li Wang, Dong–Chen He, and Thierry Baulu, "Unsupervised Classification of Remotely Sensed Multispectral Image Data," Canadian Journal of Remote Sensing, Jul. 1992.

Susan K. Jenson and Frederick A. Waltz, "Principal Components Analysis and Canonical Analysis In Remote Sensing", ASP–ACSM Annual Meeting, Washington, DC, Mar. 18–23, 1979.

Zbigniew Michalewicz, and Naguib F. Attia, "Genetic Algoritm+Simulated Annealing=GENOCOP II: A Tool for Nonlinear Programming".

The Gram–Schmidt Procedure.

Min Pei, Erik D. Goodman, William F. Punch III and Ying Ding, "Genetic Algorithms For Classification and Feature Extraction".

Boardman, J.W., 1993, "Automating spectral uunmixing of AVRIS data using convex geometry concepts." Summaries of the Fourth Annual JPL Airborne Geoscience Workshop, JPL Publication 302–309, pp. 11–14.

Feature Space Projection

NON-LITERAL PATTERN RECOGNITION METHOD AND SYSTEM FOR HYPERSPECTRAL IMAGERY EXPLOITATION

BACKGROUND OF THE INVENTION

The present invention relates to the field of image recognition, and more particularly to a method and system for using non-literal imagery exploitation and generic computing techniques for automatic object detection, recognition, and materials identification on multispectral and hyperspectral imagery.

Multispectral and hyperspectral image sets contain large amounts of data that are difficult to analyze by manual means. These image sets include multiple bands of image data that cannot be easily visualized or assessed. Currently, multispectral sensors collect images of a terrain or landscape and provide a handful of spectral bands of imagery, which cover the visible to short wave infrared portion of the electromagnetic spectrum. Similarly, hyperspectral sensors typically provide hundreds of spectral bands of spatial imagery that span a specific portion of the electromagnetic spectrum. As a result, hyperspectral sensors generally provide greater spectral discrimination than those systems using multispectral sensors. Improved spectral discrimination provided by hyperspectral sensors allows non-literal processing of the data to detect and classify materials and objects present in the imagery.

The phrase "non-literal imagery exploitation" covers the process of extracting nonspatial information from imagery to help characterize, detect, locate, classify, discriminate, identify, quantify, predict, track, warn, target or assess emissions, activities or events of interest represented by the image data. Prior techniques for this type of hyperspectral imagery exploitation have used a model based or a least squares approaches to detect and classify materials present in the image data.

These techniques have several shortcomings, however, because they are not robust across different sets of imagery collected from the same sensor at separate times and spatial locations. Further, these methods cannot accurately detect the presence of other materials (i. e., "spectral unmixing") of a pixel spectral signature. In addition, conventional techniques are usually complex and require a great deal of computation. They are also sensitive to sensor and atmospheric variations, and do not easily conform to non-linear sensor, atmospheric and mixing models. Finally, some of the existing multispectral and hyperspectral approaches do not easily scale as the number of endmembers in the detected image is expanded.

It is therefore desirable to have a solution that overcomes the shortcomings of prior imaging and pattern recognition techniques. It is also desirable for a solution that minimizes some of the drawbacks observed with existing methods for hyperspectral imagery exploitation and offer a more robust method of non-literal exploitation.

SUMMARY OF THE INVENTION

Systems and methods consistent with the present invention accomplish these goals and offer other benefits by providing a technique that: 1) trains data to develop underlying data models representing spectral endmembers or materials of interest; 2) is computationally efficient and easily scaleable; 3) uses specialized signature preprocessing to normalize pixel signatures and to isolate absorption events; 4) minimizes the effects of sensor and atmospheric variations; and 5) uses model based relationships to guide the search for solutions to the materials identification problem.

In accordance with one aspect, systems and methods consistent with this invention solve the basic problems associated with non-literal imagery exploitation by providing a technique that detects, unmixes, and classifies spectral signatures for terrain categorization and object identification.

A method for processing an input pixel in a spectral image consistent with the present invention provides spectral images of a plurality of different materials, identifies which materials have a spectral image with at least a minimum degree of correlation with the input pixel, selects a group of candidate vectors, each element in the candidate vector representing an abundance of a respective one of the plurality of materials, evaluates each candidate vector with a cost function, which is based upon a constrained spectral mixing model and the identified materials, and determines which candidate vector has the lowest cost, wherein the amounts of the materials present in the input spectral image corresponds to the elements in the candidate vector determined to have the lowest cost.

The summary and the following detailed description should not restrict the scope of the claimed invention. Both provide examples and explanations to enable others to practice the invention. The accompanying drawings, which form part of the detailed description, show embodiment of the invention and, together with the description, explain the principles of the invention.

BRIEF DESCRIPTION OF THE DRAWINGS

The accompanying drawings, which are incorporated in and constitute a part of this specification, illustrate embodiments consistent with the invention and, together with the description, explain the advantages and principles of the invention. In the drawings.

DETAILED DESCRIPTION

The following description of embodiment implementation of this invention refers to the accompanying drawings. Where appropriate, the same reference numbers in different drawings refer to the same or similar elements.

Figure 1:
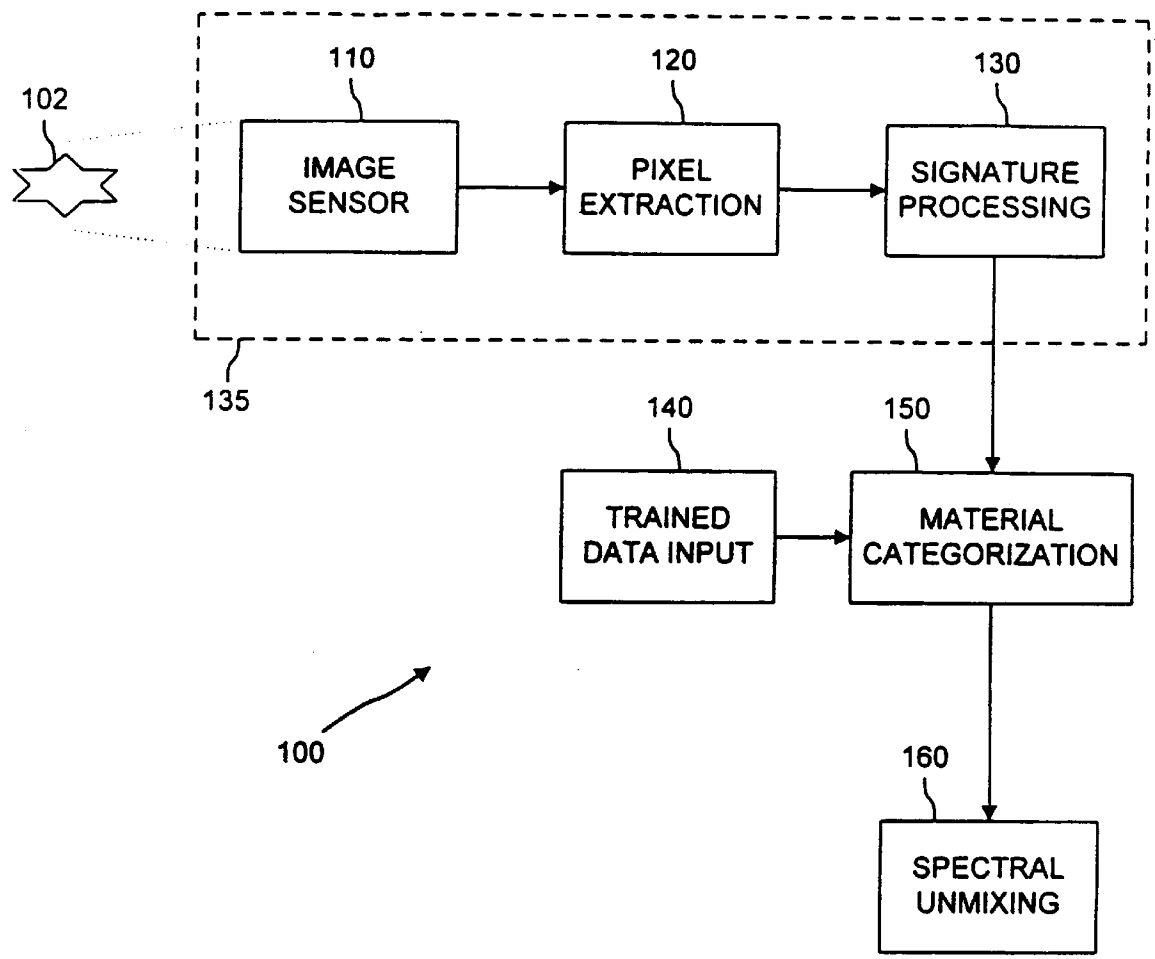
FIG. 1 is a diagram showing a system for identifying an object and its material make-up of a sampled image consistent with this invention.

FIG. 1 is a block diagram of a system 100 for identifying an object and its material make-up of a sampled image in hyperspectral imagery consistent with this invention. System 100 includes an image sensor 110, a pixel extraction section 120, a signature processing section 130, a training data input section 140, a material categorization section 150, and a spectral unmixing section 160. The combination of image sensor 110, pixel extraction section 120 and signature processing section 130 form an input processing section 135.

Image sensor 110 is preferably an optical object detection device that is capable of scanning a particular object or group of objects and providing spectral characteristic data to a processing machine. Image sensor 110 may receive data from object 102 through satellite signals, optical scanning input signals, or real-time image signals received from a remote sensor apparatus.

A processing machine that may be used to implement the systems and methods consistent with this invention is a SPARC 20 workstation from Sun Microsystems, Inc., or similar computing apparatus. As recognized by those skilled in the art, the workstation includes standard off-the-shelf computing components supplied with the commands and instructions necessary to implement the functions of system 100. Because these computing components, such as a central processing unit, memory storage components, and peripheral devices are generally known to those skilled in the art they will not be explained in greater detail. In the alternative, discrete logic devices and specially designed integrated circuits and commercially available processors can also be used to implement the systems and methods consistent with this invention.

An overview of system 100 will now be explained in greater detail. In FIG. 1, an object 102 is scanned by image sensor 110 to produces an image set defining the optical characteristics of object 102. Pixel extraction section 120 then extracts the spectral signature from a single pixel in the image set. The data in a single pixel consists of a number of data samples (typically in the hundreds), where each data sample corresponds to the reflectance or emission of photons from the object 102 at some spectral frequency. The single pixel is input to processing section 130 for signal filtering and normalization.

After processing by signature processing section 130, the pixel signature is forwarded to material categorization section 150 that attempts to identify categories, which are combinations of material signatures of interest or endmembers, related to the sensed data. In one configuration, an artificial neural network is trained to identify those categories or endmembers that have some degree of correlation with the input signature.

In the final step, spectral unmixing section 160 employs a genetic algorithm that solves a constrained spectral mixing equation to detect and estimate the abundance (g) of constituent materials that comprise the input signature. The estimated abundance (g) calculated for each endmember gives an indication of what materials are present in the input signature and the percentage of each endmember signature that is present at that point in the terrain.

Figure 2:
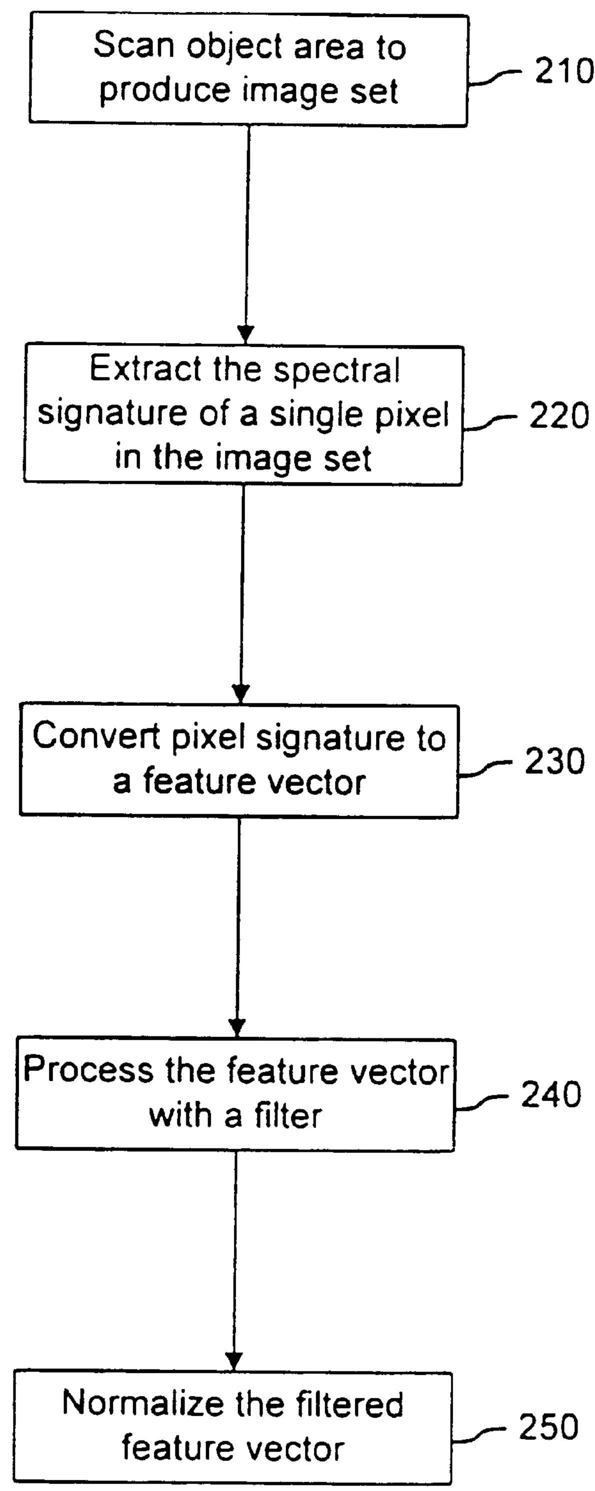
FIG. 2 is a flow chart of a process performed by an input processing section in the system of FIG. 1.

FIG. 2 is a flow chart of the processing performed by input processing section 135, consistent with the present invention. The purpose of this processing is to prepare the sensed pixel signature for materials identification and spectral unmixing. First, image sensor 102 scans object 102 to produce an image set defining the optical characteristics of object 102 (step 210). These optical characteristics include non-spacial spectral information and electromagnetic spectral band data. The optical characteristic are forwarded to pixel extraction section 120 which extracts a spectral signature from a single pixel in the image set (step 220). Prior to processing by signature processing section 130, the underlying image data is preferably calibrated and an atmospheric correction process (MODTRAN, ATREM, etc., which are public domain processes) is applied to the image set.

A sensed pixel signature, extracted by pixel extraction section 120, is input to signature processing section 130 by converting it to a feature vector of dimension N, N being the number of spectral bands in the sensor image (step 230). The elements of the feature vector correspond to the intensity of the pixel for each spectral band in the image set.

Figure 3:
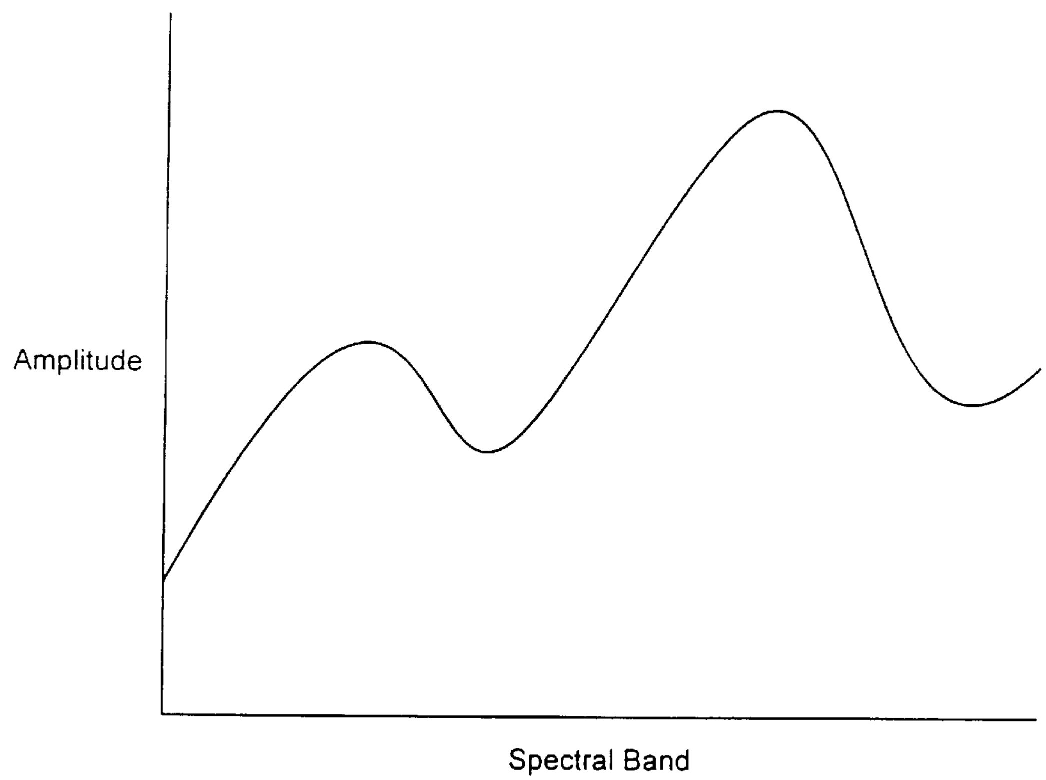
FIG. 3 is a graphical representation of a feature vector treated as a time series signal consistent with the present invention.

After the feature vector has been inputted, the elements and spectral values of the feature vector are treated as a time series and are processed by a band pass filter (step 240). The feature vector is treated as a time series signal by treating time as the spectral frequency value for each element of the feature vector. FIG. 3 shows a graphical representation of a feature vector treated as a time series signal. The band pass filter applies a differentiation, such as a simple difference of adjacent spectral intensities, to the feature vector data to remove the DC component of the signature. The band pass filter also applies a low pass filter after the differentiation to smooth the resulting signature. The characteristics of the low pass filter can be, for example, a 30 element finite impulse response filter (FIR) with a cutoff frequency of 0.25 cycles per sample and a −30db attenuation in the stop band.

The band pass filter is important for several reasons. First, it removes the local mean of the signature, which can be affected by variations in the reflectance from object space. In addition, the band pass filter smooths out very high frequency variations in the signature that are typically noise dominated and extracts the slope of the input signature that contains relevant information for identification of materials. The zero crossings of the filtered signature correspond to the significant absorption values, which are important for spectral unmixing and classification.

The final step taken by signature processing section 130 is to normalize the filtered input data (step 250). In this step, the section of the filtered waveform that corresponds to the active portion of the band pass filtered signal is extracted, such as by removing the beginning and tail of the signature that do not get properly processed by the FIR filter. This section is converted into a new feature vector of length N minus the number of samples removed from the beginning and tail of the filtered waveform to become a feature vector of length M. The new feature vector is then normalized by computing the square root of the sum of squares of the new feature vector elements (vector magnitude) and dividing each element of the new feature by the vector magnitude to create a unit vector (magnitude of the vector is unity) of dimension M. The purpose of the normalization is to remove gain terms, which aids in providing a more robust signature representation when applying the technique across diverse images without having to retrain the pattern recognition subsystem.

To teach system 100 about materials or objects of interest, a database of known materials and objects is prepared by training input data section 140 and is populated with their signatures as generated from a specific sensor of interest. This preparation process can be performed off-line so that the non-parametric subsystems (material categorization section 150 and spectral unmixing section 160, described herein) can be trained to correlate input signatures with known data.

Figure 4:
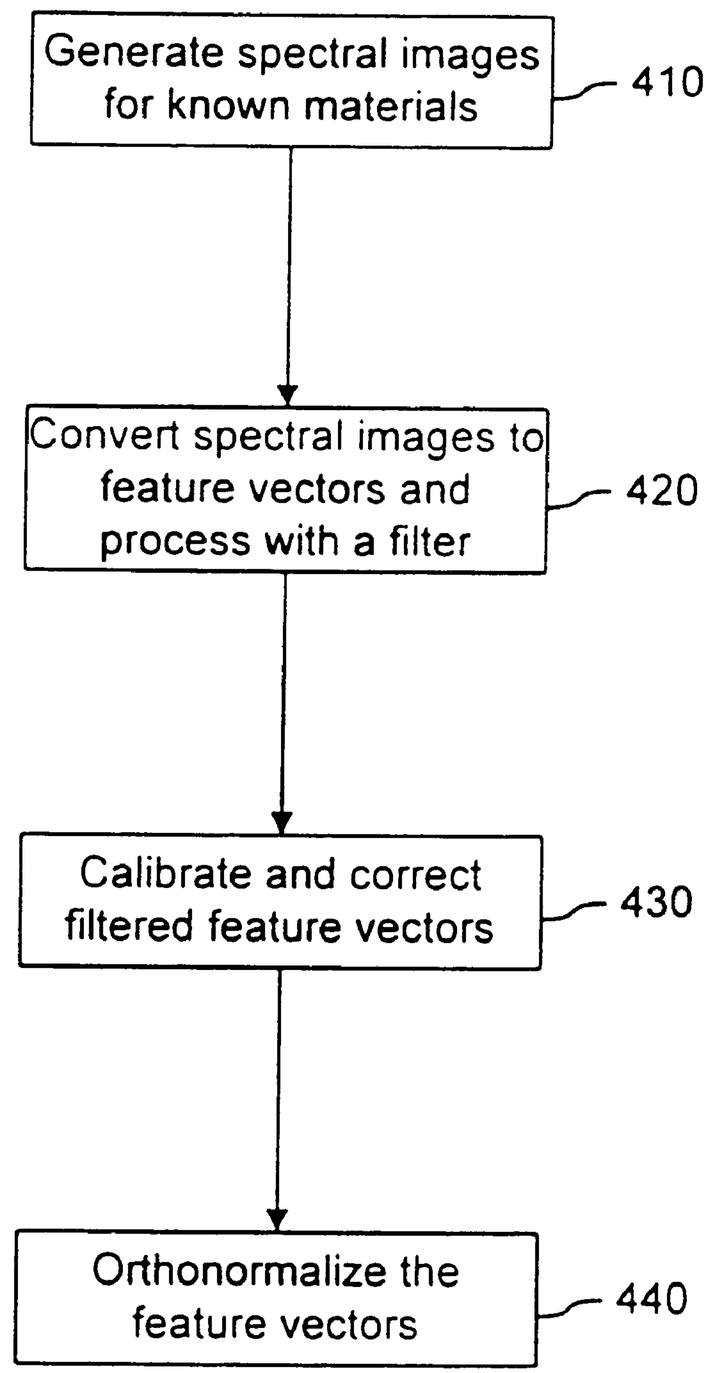
FIG. 4 is a flow chart of a training process performed by a training data section in the system of FIG. 1.

FIG. 4 shows a flow chart of the training process performed by training data section 140, consistent with the present invention. First, sample signatures are generated from a selected group of known materials or objects, referred to as endmembers (step 410). Like the input signature, these sample signatures from known materials can be generated with an image sensor or laboratory spectrometer. In addition, they are also converted to feature vectors and are preprocessed with the same band pass filter technique as described above in step 240 of FIG. 2 (step 420). The selected signatures are then calibrated and corrected using an atmospheric model prior to training (step 430).

After the calibration and correction, the processed signatures from known materials and objects are converted to M dimensional feature vectors and are orthonormalized using, for example, the Gram-Schmidt Orthogonalization process (step 440). The Gram-Schmidt Orthogonalization process is a well known process and is described, for example, in D. G. Luenberger, *Optimization by Vector Space Methods,* Stanford University, p. 53–55 (John Wiley & Sons, 1969), which is incorporated herein by reference. This orthogonalization process produces a decomposition of the feature space into a collection of orthonormal vectors, which are referred to as categories, that are linear combinations of object signatures of known materials or objects of interest, i.e., endmembers. In other words, each category is a vector, formed from a linear combination of endmembers, which is orthogonal to each other vector and normalized. The orthonormal vectors are used by material categorization section 150 to correlate sensed data and by spectral unmixing section 160 to perform the spectral unmixing through a feature space projection technique, described herein.

At this point, the input or sensed image data for a single pixel, i.e. the input signature, has been processed into a unit vector by input processing section 135. In addition the training data has been filtered and orthonormalized to span the space of known materials and object signatures by training input data section 140.

Having obtained the input signature and training data, the next step in the processing by system 100 is to select those categories that have some level of correlation with the input signature. The selection of categories is performed by material categorization section 150. To select the categories on the basis of the correlation of the input signature with known categories, material categorization section 150 can be implemented, for example, as a Self Organizing Neural Network (SONN) as described in T. Kohonen, *Self-Organization and Associative Memory,* Springer-Verlag, Heidelberg, (3rd ed. 1989), which is incorporated herein by reference.

The SONN uses a method for correlating test vectors with known data using a type of neural network that is well known in the art. A standard implementation of the SONN is trained according to known methods so that the neural network is capable of estimating the degree of correlation between the input signature and the known category signatures. The size of the network depends on the number of categories used by the application. For example, if the number of categories is 20, the network could be 20×20. Each neuron in the network corresponds to a specific category based on the known category signatures obtained from the training data.

Figure 5:
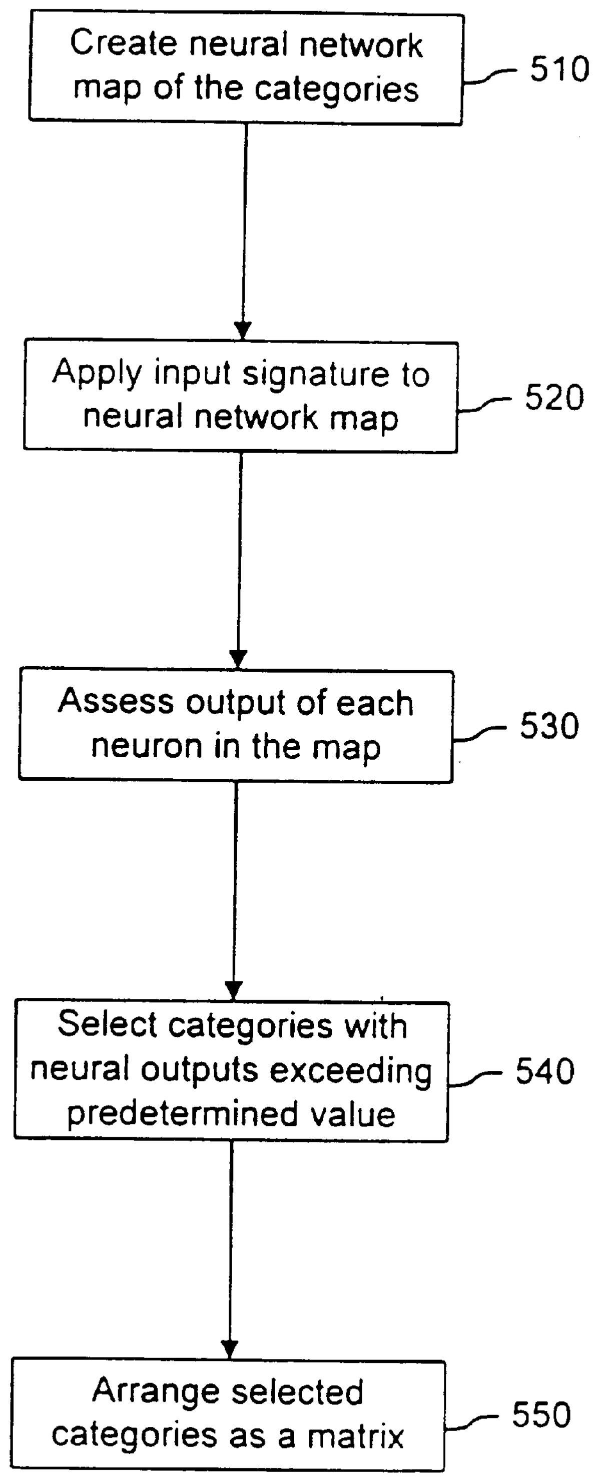
FIG. 5 is a flow chart of a process performed by a material categorization section in the system of FIG. 1.
Figure 6:
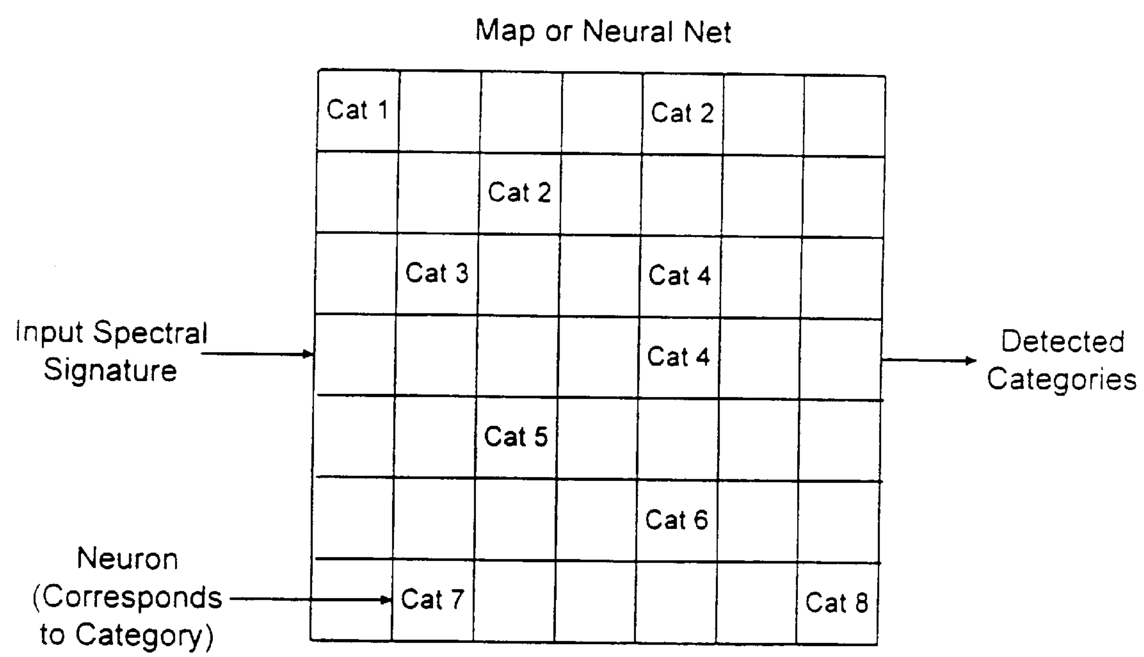
FIG. 6 is an example of a map of a two-dimensional neural network array consistent with the present invention.

FIG. 5 shows a flow chart of the process performed by material categorization section 150, consistent with the present invention. First, a map of the neural responses for each category and the neural network is established during a training cycle using the categories developed by training data input section 140 (step 510). The training process is simple and fast. During the training cycle, the neural net learns to associate known input signatures with specific areas in the net. The method used to train and process signatures is described, for example, in T. Kohonen, *Self-Organization and Associative Memory,* Springer-Verlag, Heidelberg, (3rd ed. 1989), which is incorporated herein by reference. For the training process, an input test vector is applied to each of the neurons in the network. The response of each neuron corresponds to how closely the category matches the input test vector. After it is determined which neuron most closely matches the input test vector, this neuron and its physical neighbors are adjusted or trained according to a weighting factor. This process is repeated for a series of input test vectors. During the training process, the weight adjustment and the number of neighboring neurons which are adjusted is gradually decreased, resulting in an even distribution of the neurons over a square network. FIG. 6 is an example of a simulated cortical map represented by a two-dimensional array of artificial neurons, which can be used to identify those categories that correlate to the input spectral signature.

After the training process is complete, an input signature is applied to the map to identify the categories that correlate with the input signature (step 520). The input signature is processed by the neural network and the output of all neurons in the network is assessed (step 530). The neuron output range can be, for example, between 0.0 and 1.0, where the upper range corresponds to a better correlation. Categories are then selected when the corresponding neuron output range exceeds a predetermined value, such as 0.50 (step 540). Thus, if one or more neurons in the network has a response that exceeds 0.50, then the category that corresponds to that neuron is selected as a candidate for subsequent processing. This step reduces the dimensionality of the problem. The selected categories are then arranged as part of a matrix E (step 550). Each of the selected categories is a vector that makes up a single column in matrix E. Thus, the number of rows in matrix E corresponds to the number of spectral bands in each category vector, namely M.

Once the categories showing sufficient correlation to the input signature have been selected, spectral unmixing section 160 uses the selected categories to identify the abundances of the endmembers in the input signature. To make this identification, spectral unmixing section 160 solves an associated constrained optimization problem. To solve this problem, spectral unmixing section 160 can use an Evolutionary Computing (EC) process. Evolutionary Computing encompasses methods from Genetic Algorithms, Genetic Programming, Artificial Neural Networks and even Artificial Life to evolve solutions to complex mathematical and pattern recognition problems. In addition, these methods can be used to automatically generate powerful "rules" or "algorithms" that directly address the complexities associated with processing remotely sensed data to achieve higher performance over conventional approaches for non-literal interpretation.

Figure 7:
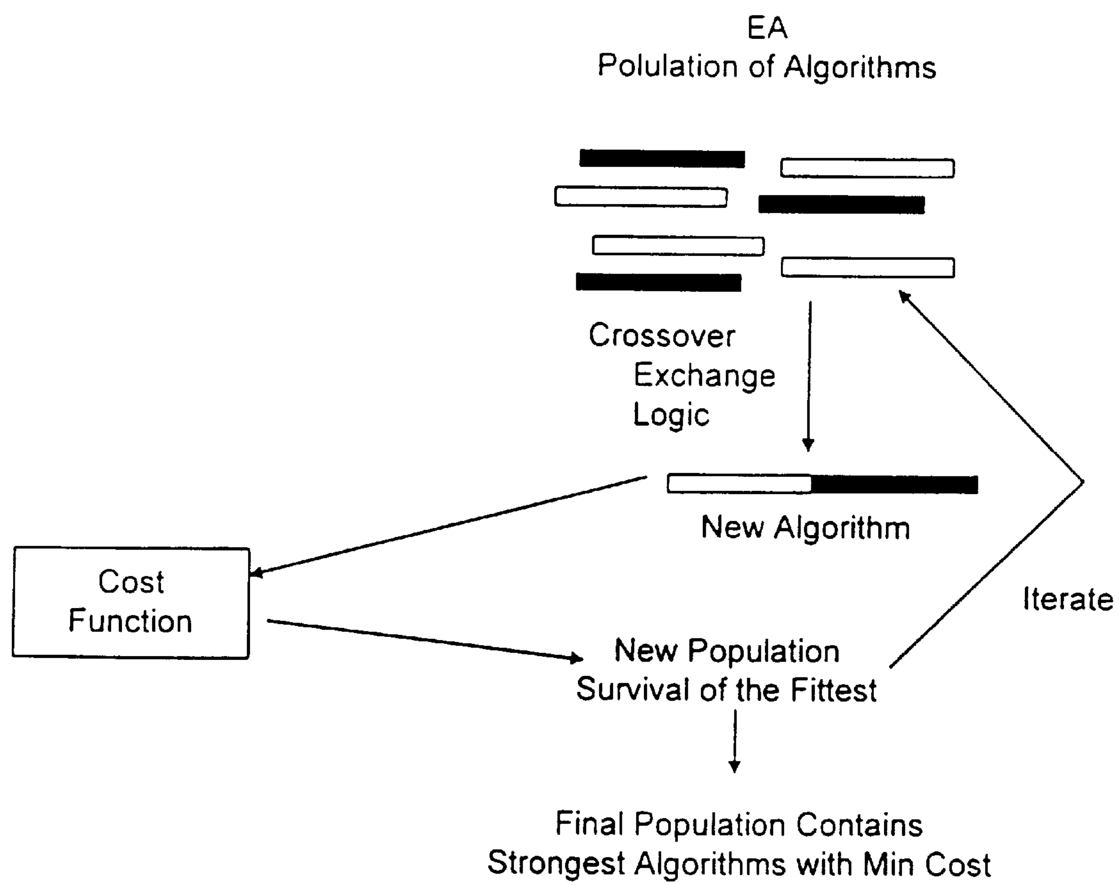
FIG. 7 is a graphical representation of an Evolutionary Algorithm (EA) process consistent with the present invention.

As shown in FIG. 7, an Evolutionary Algorithm (EA) typically starts out with a population of algorithms that are randomly selected, where each member of the population is capable of processing some given set of feature or training data, such as some known hyperspectral imagery or HSI pixel samples. The key idea behind EA is to generate solutions to the underlying problem (i.e. good or approximate solutions) using methods similar to Darwinian biological evolution.

Given a population of algorithms that attempt to solve the underlying problem of interest, the next step would be to generate a new population of algorithms by randomly selecting parts of existing algorithms and interchanging the internal logic ("genetic material") of one algorithm with another. The process of interchanging the internal logic of two algorithms is referred to as crossover. The crossover function is performed so that the exchange is meaningful in the sense that the interchange of logic properly fits into the offspring algorithms so that two new algorithms are formed that are capable of processing the training set of data in a consistent fashion. A mutation operator is also applied randomly to modify the population of algorithms to ensure diversity and to help find good solutions.

Each algorithm is capable of evaluating the training data and can be scored on how well it can solve the underlying problem based on a user supplied cost function. Given that the crossover/mutation operations are performed on the current population of algorithms, the next step involves the application of the cost function to determine the most fit (or best) algorithms. A subset of the best algorithms are selected to form the next generation while at the same time the weaker algorithms die off. In other words, the weaker algorithms are eliminated from the next generation in accordance with the survival of the fittest model. The process is then iterated over a fixed number of generations. In general, these methods lead to rapid convergence to approximate or exact algorithmic solutions to the problem. This technique can be used to solve problems like spectral unmixing, object detection and materials identification on standard workstations and have been efficiently implemented for rapid nonliteral interpretation of hyper-spectral image data.

The algorithm having the lowest cost is tracked over all generations and represents the final solution to the underlying problem. The difference between EA and conventional methods is that EA will generally do a better job of finding solutions because it attempts to search the solution space in a broader manner versus conventional approaches. EA performs a massively parallel search of the solution space and can handle very complicated optimization problems with constraints including those associated with the materials identification and object classification. Moreover, EA is also capable of handling non-linear spectral mixing models such as those that may arise from more detailed atmospheric or sensor related constraints. One can also incorporate model based guidance for the search in the cost function. An EA, such as Genecop 3 as described in Z. Michalewicz, *Genetic Algorithms+Data Structures=Evolution Programs,* Springer Verlag, (2d ed., 1994), can be used to perform this processing and is incorporated herein by reference.

Since an EA is useful for solving complex constrained optimization problems, an EA can be used to solve a constrained linear spectral mixing model consistent with the present invention. This constrained linear spectral mixing model is based on the following equations:

$$G_b * DN_b + O_b = \sum_{r=1}^{N} g_r * R_{rb} + E_b \quad (1)$$

where $G_b$ and $O_b$ account for sensor and atmospheric effects, DN is the digital number representing the raw data obtained by image sensor 110, g is a scalar value representing the fractional or percentage abundance of an endmember, R is the laboratory or field reflectance for an endmember, E (a scalar value different from the matrix E) is a band residual, such as noise, b is the spectral band number, r is the endmember number, and N is the number of endmembers. Equation (1) represents the unconstrained part of the optimization problem.

The constrained linear spectral mixing model also includes the following equations:

$$\sum_{r=1}^{N} g_r = 1 \quad (2)$$

$$0 \le g_r \le 1 \quad (3)$$

where g, r and N represent the same variables as in equation (1). Equations (2) and (3) are constraint equations because they limit the sum total of the g values to 1 and the value of each g to between 0 and 1.

Figure 8:
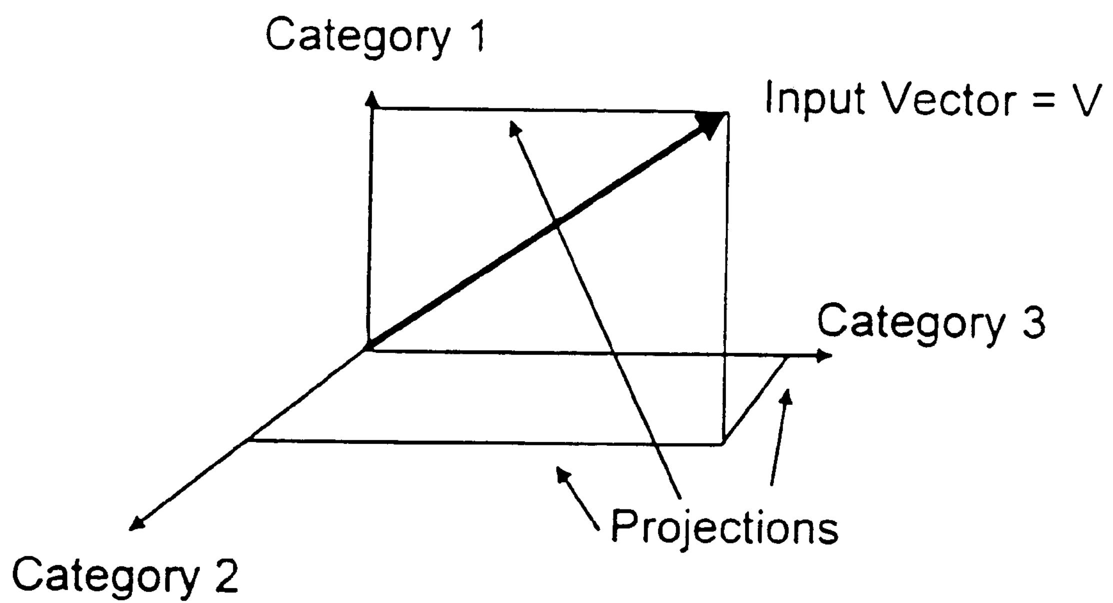
FIG. 8 is a graphical representation of a feature space projection consistent with the present invention.

The solution to this constrained linear spectral mixing model is mathematically equivalent to a constrained feature space projection (or best estimate of the projection) of the input signature onto the subspace spanned by the categories selected by material categorization section 150. FIG. 8 shows an example of a feature space projection with three selected categories and an input signature represented as an input vector V that spans the subspace of the three categories. Input vector V can be viewed as a simplified version of the left side of the equality in equation (1). Since input vector V spans the subspace of the selected categories, input vector V can also be viewed as a linear combination of the selected categories. Since input vector V is a linear combination of the selected categories, input vector V can be derived as follows:

$$V = \sum_i a_i cat_i = \sum_i a_i \sum_i b_{ij} endmember_j = \sum_k g_k endmember_k = Eg \quad (4)$$

In equation (4), the first summation represents the linear combination of categories where $a_i$ is a scalar weighting factor for the particular category $cat_i$ Since each category is a linear combination of endmembers, $cat_i$ is equivalent to the product of $b_{ij}$ and $endmember_j$ where $b_{ij}$ is a weighting factor for the particular $endmember_j$. This equivalence for $cat_i$ is based on the Gram-Schmidt orthogonalization process described above. In the last summation, the weighting factors a and b are combined, which is equivalent to the abundances $g_k$. The last summation is equivalent to the product of matrix E and the vector g, the vector g having elements $g_k$ that correspond to the individual abundances for each endmember. The product Eg is a simplified version of the equation on the right side of the equality in equation (1). Thus, the vector-matrix equation V=Eg is a simplified version of equation (1).

The estimate of g is obtained by solving the vector-matrix equation V=Eg for g using a pseudo inverse method. The pseudo inverse provides the best least squares estimate of the abundances g and is exact if the matrix E is invertible. Solving for g results in the following equation:

$$\hat{g}=(E^T E)^{-1} E^T V \quad (5)$$

where the hat over g corresponds to an approximate solution given by the pseudo inverse operation. This equation corresponds to the solution for the unconstrained part of the optimization problem represented by equation (1). The solution found for g determines the abundances present of a specific material or object (identification) and the percentage of the signature present in the input sample (spectral unmixing).

Given equation (5) as the solution to the unconstrained part of the optimization problem, the following equation can be used as the cost function for the EA to solve the constrained linear spectral mixing model:

$$Cost = \left(\sum_i g_i - 1\right)^2 + \left\|g - (E^T E)^{-1} E^T V\right\|^2 \tag{6}$$

where $\|x\|$ is the magnitude of the vector x, $g_i$ is a scalar and g is a vector. This cost function incorporates the underlying linear spectral mixing model and the constraint that the $g_k$'s sum to unity. Specifically, the left side of the cost function equation (6) corresponds to the limitation that the $g_k$'s sum to unity, and the right side corresponds to the underlying linear spectral mixing model. Equation (6) is a preferred example of a cost function to be used in spectral unmixing section 160 consistent with the present invention. Other cost functions, however, can also be used. This implementation of the cost function allows the EA to converge rapidly and expedites the processing to create an efficient solution. The minimum cost solution obtained from the EA provides a list of the detected materials and their associated abundances.

Figure 9:
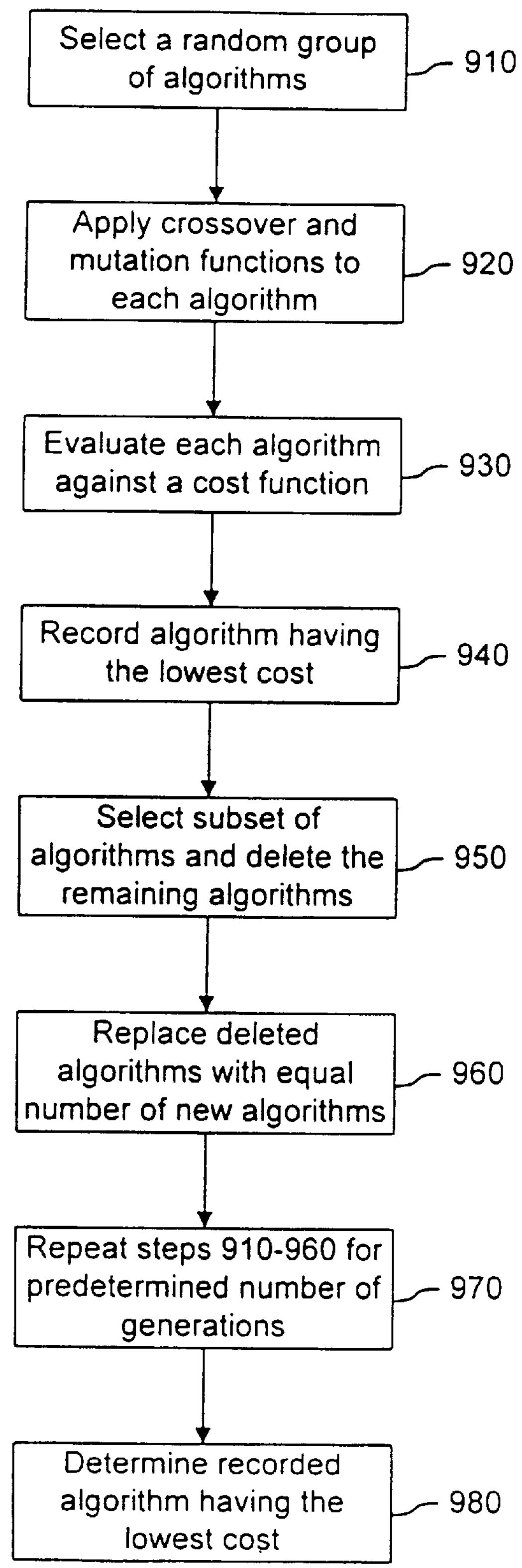
FIG. 9 is a flow chart of a process performed by a spectral unmixing section in the system of FIG. 1.

FIG. 9 shows a flow chart of a process performed by spectral unmixing section 160, consistent with the present invention, for identifying the materials and abundances of the materials in an input signature. This process performed by spectral unmixing section 160 can be implemented as an EA, such as GENECOP 3. The first step in the process is to select a random group of algorithms (step 910). In this process, the algorithms each represent a candidate vector g, each element in candidate vector g corresponding to the abundance of an endmember. The selected group of algorithms represent a first generation in the evolutionary process.

The algorithms are then subjected to the crossover and mutation functions described above (step 920). In particular, parts of selected pairs of algorithms are interchanged to form new pairs of algorithms, and randomly selected elements in the algorithms are also modified. After applying these functions, each algorithm is evaluated by the cost function, such as equation (6) above (step 930). In equation (6), the vector g on the right side of the equation corresponds to the candidate vector g of the algorithm being evaluated. The scalar values $g_i$ on the left side of the equation correspond to each of the elements of the candidate vector g being evaluated. After each algorithm has been evaluated, the algorithm with the best score, i.e. having the cost or value closest to zero, is recorded (step 940).

A subset of the algorithms is then selected from the entire group of algorithms, and the remaining algorithms are eliminated (step 950). The selection of this subset can be based on the score from the evaluation by the cost function. For example, the algorithms having a score within a predetermined threshold of zero would be selected, and those outside the threshold would be removed. The algorithms that are removed are replaced by an equal number of new, randomly selected algorithms to form a new generation (step 960). The process is then repeated for a predetermined number of generations (step 970). The actual number of generations for which the process is executed can be varied. In general, the results improve by processing a greater number of generations. Finally, after all the generations have been processed, the algorithm selected as the solution is the algorithm which was recorded as having the lowest cost (step 980).

Appendix A is a paper entitled "Non-literal pattern recognition method for hyperspectral imagery exploitation using evolutionary computing methods," by Jerry A. Burman, which is incorporated herein in its entirety.

CONCLUSION

Systems consistent with the present invention perform multispectral and hyperspectral image analysis and identification. They are computationally efficient and easily scaleable, and effectively detects, unmixes, and classifies spectral signatures for terrain categorization and object identification.

Those skilled in the art will recognize that various modifications and variations can be made in the preceding examples without departing from the scope or spirit of the invention. The specification does not limit the invention. Instead it provides examples and explanations to allow persons of ordinary skill to appreciate different ways to practice this invention. The following claims define the true scope and spirit of the invention.

What is claimed is:

1. An image processing method, comprising the steps of:

receiving a spectral image of an object;

extracting an input pixel from the spectral image;

converting the input pixel into a vector, each element in the vector of the input pixel representing a reflectance of a respective one of a plurality of spectral bands;

providing spectral signatures of a plurality of endmembers;

correlating a plurality of test spectral images with the spectral signatures of the endmembers;

creating a map of the spectral signatures of the endmembers based on the correlations with the plurality of test vectors;

identifying the spectral signatures of endmembers having a correlation with the input pixel that exceeds a predetermined threshold, including the substep of applying the input pixel to the map to determine which spectral signatures of the endmembers have a correlation with the input pixel that exceeds the predetermined threshold; and determining a combination of the endmembers present in the input pixel based on the identified endmembers.

2. An image processing method, comprising the steps of:

receiving a spectral image of an object;

extracting an input pixel from the spectral image;

converting the input pixel into a vector, each element in the vector of the input pixel representing a reflectance of a respective one of a plurality of spectral bands;

providing spectral signatures of a plurality of endmembers;

identifying the spectral signatures of endmembers having a correlation with the input pixel that exceeds a predetermined threshold; and determining a combination of the endmembers present in the input pixel based on the identified endmembers, which further comprises the substeps of:

selecting a group of candidate vectors, each element in the candidate vector representing an abundance of a respective one of the plurality of endmembers;

evaluating each candidate vector with a cost function, which is based upon a constrained spectral mixing model and the identified endmembers; and determining which candidate vector has the lowest cost, wherein the amounts of the endmembers present in the input pixel corresponds to the elements in the candidate vector determined to have the lowest cost.

3. A method for processing an input pixel of a spectral image, comprising the steps of:

providing spectral signatures of a plurality of endmembers;

correlating a plurality of test spectral images with the spectral signatures of the endmembers;

creating a map of the spectral signatures of the endmembers based on the correlations with the plurality of test vectors;

identifying which spectral signatures of the endmembers have a minimum correlation with the input pixel by applying the input pixel to the map; and determining a combination of the endmembers present in the input pixel based on the identified endmembers, wherein the determining step includes the substeps of: selecting a group of candidate vectors, each element in the candidate vector representing an abundance of a respective one of the plurality of endmembers; evaluating each candidate vector with a cost function, which is based upon a constrained spectral mixing model and the identified endmembers; and determining which candidate vector has the lowest cost, wherein the amounts of the endmembers present in the input pixel corresponds to the elements in the candidate vector determined to have the, lowest cost.

4. A method for processing an input pixel of a spectral image, comprising the steps of:

scanning an object area to produce the spectral image; extracting the input pixel from the spectral image; converting the input pixel into a vector, each element in the vector of the input pixel representing a reflectance of a respective one of a plurality of spectral bands;

providing spectral signatures of a plurality of endmembers; correlating a plurality of test spectra images with the spectral signatures of the endmembers; and creating a map of the spectral signatures of the endmembers based on the correlations with the plurality of test vectors;

identifying the spectral signatures of endmembers having a correlation with the input pixel that exceeds a predetermined threshold;including the substep of applying the input pixel to the map to determine which spectral signatures of the endmembers have a correlation with the input pixel that exceeds the predetermined threshold;

selecting a group of candidate vectors, each element in the candidate vector representing an abundance of a respective one of the plurality of endmembers;

evaluating each candidate vector with a cost function, which is based upon a constrained spectral mixing model and the identified endmembers; and determining which candidate vector has the lowest cost, wherein the amounts of the endmembers present in the input pixel corresponds to the elements in the candidate vector determined to have the lowest cost.

5. An image processing apparatus comprising:

an input processing section for scanning an object area to produce a spectral image, extracting an input pixel from the spectral image, and converting the input pixel into a vector, each element in the vector of the input pixel representing a reflectance of a respective one of a plurality of spectral bands;

a training data section for providing spectral signatures of a plurality of endmembers;

a material categorization section for identifying the spectral signatures of endmembers having a correlation with the input pixel that exceeds a predetermined threshold, wherein the material categorization section includes subsections for correlating a plurality of test spectral images with the spectral signatures of the endmembers and creating a map of the spectral signatures of the endmembers based on the correlations with the plurality of test vectors, wherein the material categorization section applies the input pixel to the map to determine which spectral signatures of the endmembers have a correlation with the input pixel that exceeds the predetermined threshold; and a spectral unmixing section for determining a combination of the endmembers present in the input pixel based on the identified endmembers.

6. An image processing apparatus comprising:

an input processing section for scanning an object area to produce a spectral image, extracting an input pixel from the spectral image, and converting the input pixel into a vector, each element in the vector of the input pixel representing a reflectance of a respective one of a plurality of spectral bands, a training data section for providing spectral signatures of a plurality of endmembers;

a material categorization section for identifying the spectral signatures of endmembers having a correlation with the input pixel that exceeds a predetermined threshold; and a spectral unmixing section for determining a combination of the endmembers present in the input pixel based on the identified endmembers, further comprising:

a subsection for selecting a group of candidate vectors, each element in the candidate vector representing an abundance of a respective one of the plurality of endmembers;

a subsection for evaluating each candidate vector with a cost function, which is based upon a constrained spectral mixing model and the identified endmembers; and a subsection for determining which candidate vector has the lowest cost, wherein the amounts of the endmembers present in the input pixel corresponds to the elements in the candidate vector determined to have the lowest cost.

* * * * *

UNITED STATES PATENT AND TRADEMARK OFFICE

CERTIFICATE OF CORRECTION

PATENT NO. : 6,075,891
DATED : June 13, 2000
INVENTOR(S) : Jerome Allen Burman

It is certified that error appears in the above-indentified patent and that said Letters Patent is hereby corrected as shown below:

Column 4, line 27, delete "30 element" and insert - - 30-element - -

Column 8, line 38, delete "$cat_i$;" and insert - - $cat_i$. - -

Column 11, line 42, delete "threshold;including" and insert - - threshold, including - -

Signed and Sealed this

First Day of May, 2001

Attest:

NICHOLAS P. GODICI

*Attesting Officer* *Acting Director of the United States Patent and Trademark Office*